(12) United States Patent
Girardin (10) Patent No.: US 6,918,722 B1
(45) Date of Patent: Jul. 19, 2005

(54) DOUBLE PLUNGER TRACK FITTING (75) Inventor: Jean-Marc Girardin, North Miami Beach, FL (US)

(73) Assignee: Valeda Company LLC, Fort Lauderdale, FL (US)

( * ) Notice: Subject to any disclaimer, the term of this patent is extended or adjusted under 35 U.S.C. 154(b) by 0 days.

(21) Appl. No.: 10/787,944

(22) Filed: Feb. 27, 2004

(51) Int. Cl.⁷ .................................................. B60P 7/08
(52) U.S. Cl. ......................................... 410/105; 410/8
(58) Field of Search ............................ 410/8, 104, 105

(56) References Cited

U.S. PATENT DOCUMENTS

| 4,047,689 | A | * | 9/1977 | Grendahl | 410/105 |
|---|---|---|---|---|---|
| 4,496,271 | A | * | 1/1985 | Spinosa et al. | 410/105 |
| 4,688,843 | A | * | 8/1987 | Hall | 296/65.04 |
| 4,771,969 | A | * | 9/1988 | Dowd | 244/118.6 |
| 4,850,769 | A | * | 7/1989 | Matthews | 410/105 |
| 5,026,225 | A | | 6/1991 | McIntyre | 410/23 |
| 5,302,065 | A | | 4/1994 | Vogg et al. | 411/107 |
| 5,337,979 | A | * | 8/1994 | Bales et al. | 244/118.1 |
| 5,489,172 | A | | 2/1996 | Michler | 410/105 |
| 5,762,296 | A | * | 6/1998 | Gilbert | 244/118.1 |
| 5,823,727 | A | | 10/1998 | Lee | 411/85 |
| 5,871,318 | A | | 2/1999 | Dixon et al. | 410/105 |
| 5,975,822 | A | | 11/1999 | Ruff | 411/553 |
| 6,149,359 | A | | 11/2000 | Cardona | 410/11 |
| 6,287,060 | B1 | | 9/2001 | Girardin | 410/7 |
| 6,361,238 | B1 | | 3/2002 | Schittl et al. | 403/122 |

* cited by examiner

Primary Examiner—Dennis H. Pedder
Assistant Examiner—Paul Chenevert
(74) Attorney, Agent, or Firm—Dowell & Dowell, P.C.

(57) ABSTRACT

A spring loaded double plunger track fitting for use in securing a wheelchair or the like to a floor track mounted in a vehicle. The track fitting includes at least four track engaging lugs on each side thereof and a pair of spring loaded plungers between adjacent pairs of lugs to lock into the floor track when the fitting slides therealong. A visual means to indicate when the plungers are in the locked position may be provided.

8 Claims, 9 Drawing Sheets

DOUBLE PLUNGER TRACK FITTING

FIELD OF INVENTION

This invention relates to wheelchair restraint systems and more particularly to an improved spring-loaded track fitting for adjustably securing a wheelchair tie down strap to a floor track mounted in a vehicular conveyance.

BACKGROUND OF INVENTION

Conventionally, buses and vans equipped to carry wheelchairs and the like are provided with a pair of parallel slotted floor tracks into which one or more strap anchor fittings can be inserted and secured at any selected position therealong. Usually such anchors are provided with a spring-loaded plunger, the lower end of which can be passed through an opening in the track and, upon release of the spring, the sides of the plunger releasably engage with the track at any selected position therealong. While such fittings are generally effective they are not without their disadvantages. The fact that they are secured to the track at substantially one end of the anchor fitting implies that there is a considerable moment of force applied to the fitting when a heavy load, as in a sudden deceleration or crash situation, is applied thereto and this can cause bending or twisting of the fitting or of the track itself so that the fitting jams in the track and no longer slides freely therealong. There is a need, therefore, for an improved track fitting that spreads the applied load along a longer length of the fitting and track so as to prevent or at least minimize such bending or twisting of the fitting and/or the track.

OBJECT OF INVENTION

An object of the present invention is to provide a track plunger fitting that engages two adjacent holes in a conventional floor track so as to eliminate or reduce any twisting action on the fitting. In order to accommodate two plungers without increasing the overall height of the device, a split plunger with overlapping heads in employed.

BRIEF DESCRIPTION OF INVENTION

By one aspect of this invention there is provided a double plunger track fitting comprising:

a body member including means to secure a restraining strap thereto, and at least four track engaging lugs on each side of said body and extending laterally therefrom when in operative position;

spring loaded means on each side of said body member, each having a pair of plungers longitudinally from each other and adapted to slide, when in operative position, between two adjacent pairs of said track engaging lugs between a raised unlocked position and a lowered locked position; and finger grip means on each said spring loaded means arranged in overlying relationship to each other.

DETAILED DESCRIPTION OF PREFERRED EMBODIMENTS

Figure 1:
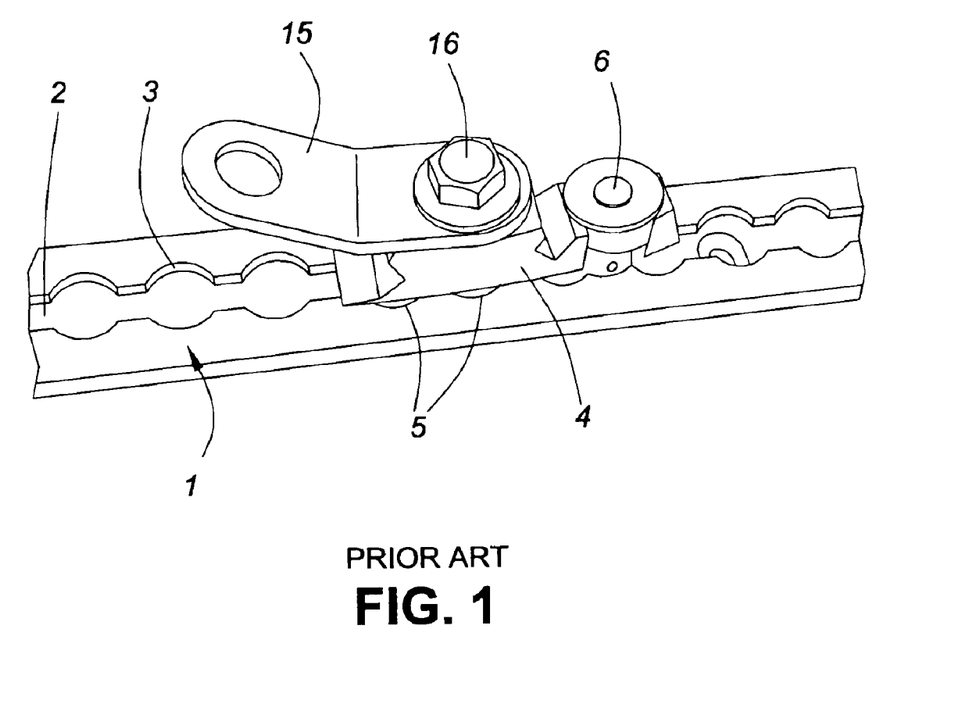
FIG. 1 is an isometric view of a plunger type track fitting according to the prior art and provided with a single plunger.

In FIG. 1 there is shown a conventional floor track 1, generally formed from extruded aluminum and provided with a C-shaped track 2 and a plurality of slots 3, uniformly spaced along the length thereof. A die cast or forged metal track fitting 4 having a pair of outwardly extending lugs 5, which can be inserted in any adjacent pair of slots 3, and so that the tops of the lugs 5 engage the underside of the C-shaped section of track 2, is locked into any selected position along the length thereof by means of a spring loaded plunger 6 which engages a selected slot 3. It will be appreciated that the fitting is relatively short and only two lugs on each side engage with the track so that there is some tendency to twist when a load is applied upwardly, which can occur in an emergency crash or stop situation.

Figure 2:
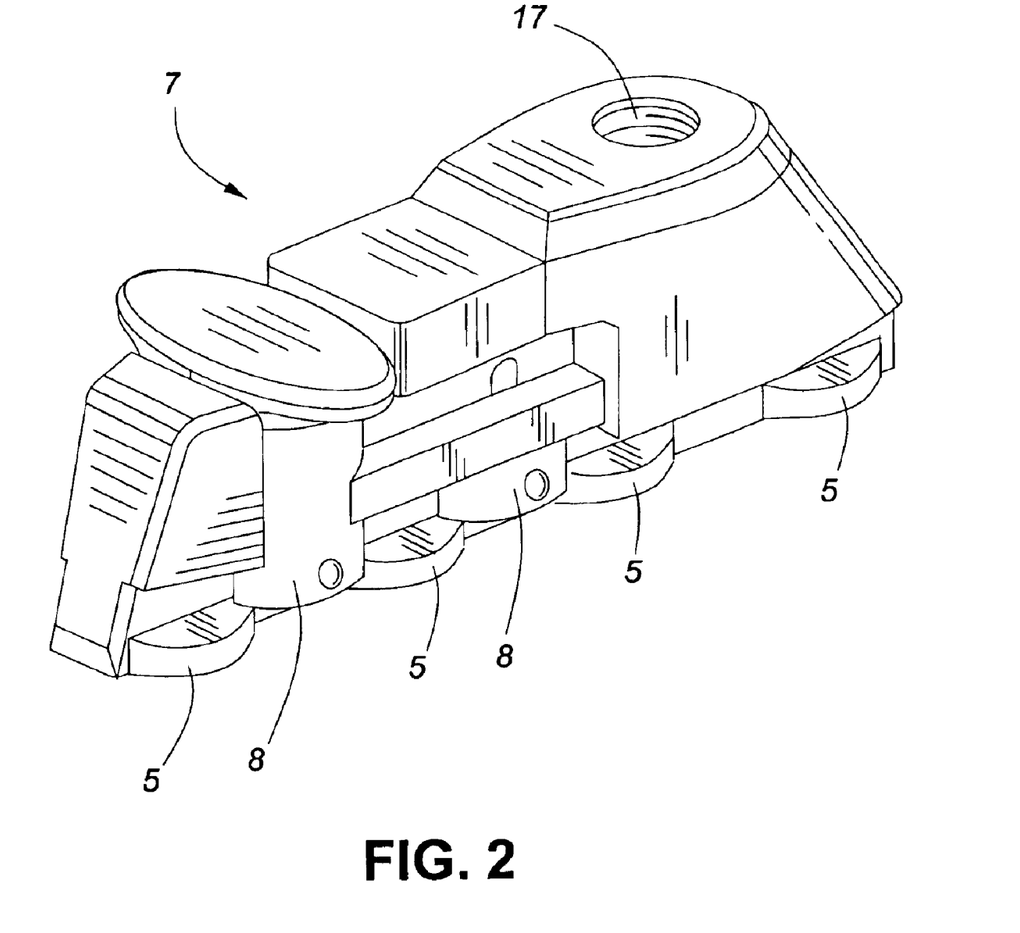
FIG. 2 is an isometric view of one embodiment of the track fitting and double plunger of the present invention.
Figure 3:
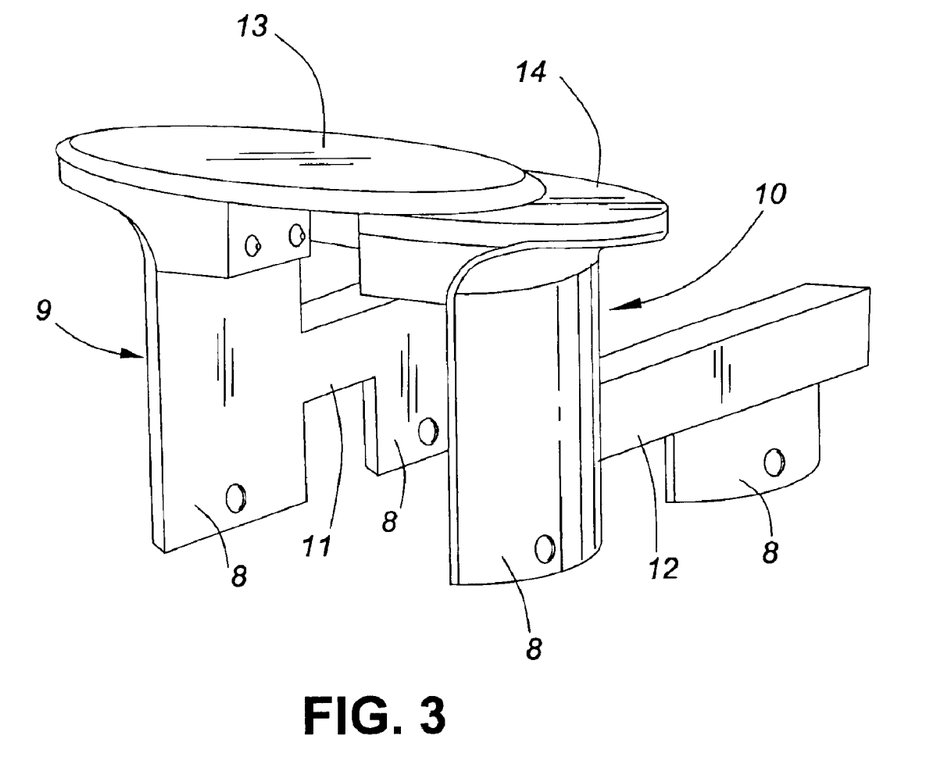
FIG. 3 is an isometric enlarged view of the plunger of the embodiment of FIG. 2.
Figure 4:
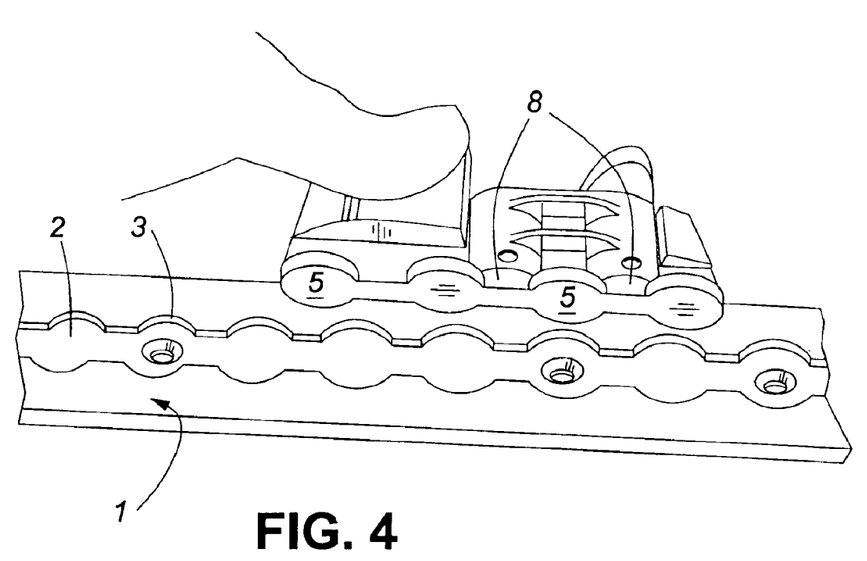
FIG. 4 is an isometric view of the plunger of FIG. 2 as inserted into a floor track.

In FIG. 2 there is shown a track fitting 7 according to one embodiment of the present invention which is designed so that four lugs 5 can be inserted into four adjacent slots 3 in a conventional floor track 2, and slid therealong until two spring loaded plungers 8 drop into a pair of adjacent slots 3 on each side of the track 2, as seen most clearly in FIG. 4. It will be appreciated that, as lugs 5 are inserted into slots 3, the lower surfaces of plungers 8 engage the top surface of the track 1, the internal compression springs (not shown) therein are compressed when the lugs 5 are fully inserted in the slots 3, the fitting 7 can then slide along the track 2 until the plungers 8 are exactly located over an adjacent pair of slots 3, whereupon the compressed springs force the plungers 8 downwardly into the slots 3, thereby locking the fitting 4 securely in a selected position along the track 1. Usually, but not essentially, the plungers 8 are fabricated in any conventional thermoplastic or thermosetting plastic material, such as glass filled nylon or similar abrasion resistant material. For ease of manufacture, it has been found preferable to make the plungers 8 in two parts 9, 10, each having a pair of plungers 8 in spaced longitudinal alignment to each other, and interconnected by a side body member 11, 12 respectively. Each part 9, 10 is provided with a substantially oval shaped planar finger grip 13, 14, in overlying relationship to each other, as shown in FIGS. 2 and 3. In order to release the fitting 4 from track 1, upward finger pressure is applied to grips 13, 14 to raise the plungers 8 out of their respective slots 3 so that fitting 4 can slide along track 1 until the lugs 5 are aligned with an adjacent pair of slots 3 and can be removed therefrom. Because the track fitting of the present invention is considerably longer than that of the prior art, as exemplified in FIG. 1, there is far less tendency for the fitting 4 to twist and bind in the track 1.

It will, of course, be appreciated that a strap engaging lug 15 may be secured by a bolt 16 (as seen in FIG. 1) insertable in threaded bore 17 (FIG. 2) in conventional manner.

Figure 5:
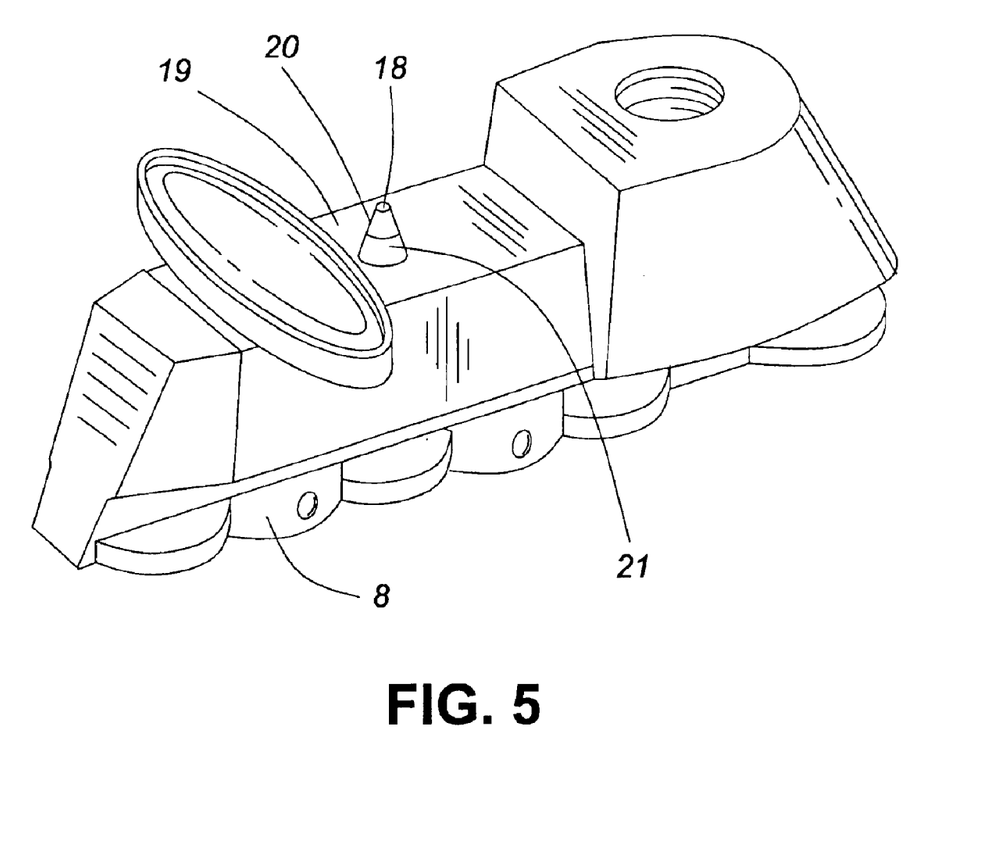
FIG. 5 is an isometric view of the embodiment of FIG. 2 incorporating one type of locking indicator.

It has also been found that, in the event dirt enters the track or a track bolt is loose, the plungers 8 may appear to be locked in place but are in fact not securely locked and it is possible that, in the event of a sudden stop or accident, the track fitting will separate from the track thereby releasing the restraint system to the danger of the wheelchair passenger. It is advisable, therefore, that the the double plunger system should also incorporate a visual indicator to show that the plungers 8 are in the fully locked position. One such indicator 18 is shown in FIG. 5 and comprises a multi-coloured pin which extends through a cover 19 on plungers 8. The top of the pin 18 may be coloured, say red on the top and along part of the sides 20 thereof, but green along the lower sides 21 thereof. The green lower portions are, of course, only visible when the plungers 8 are fully engaged and locked in place on the track.

Figure 6:
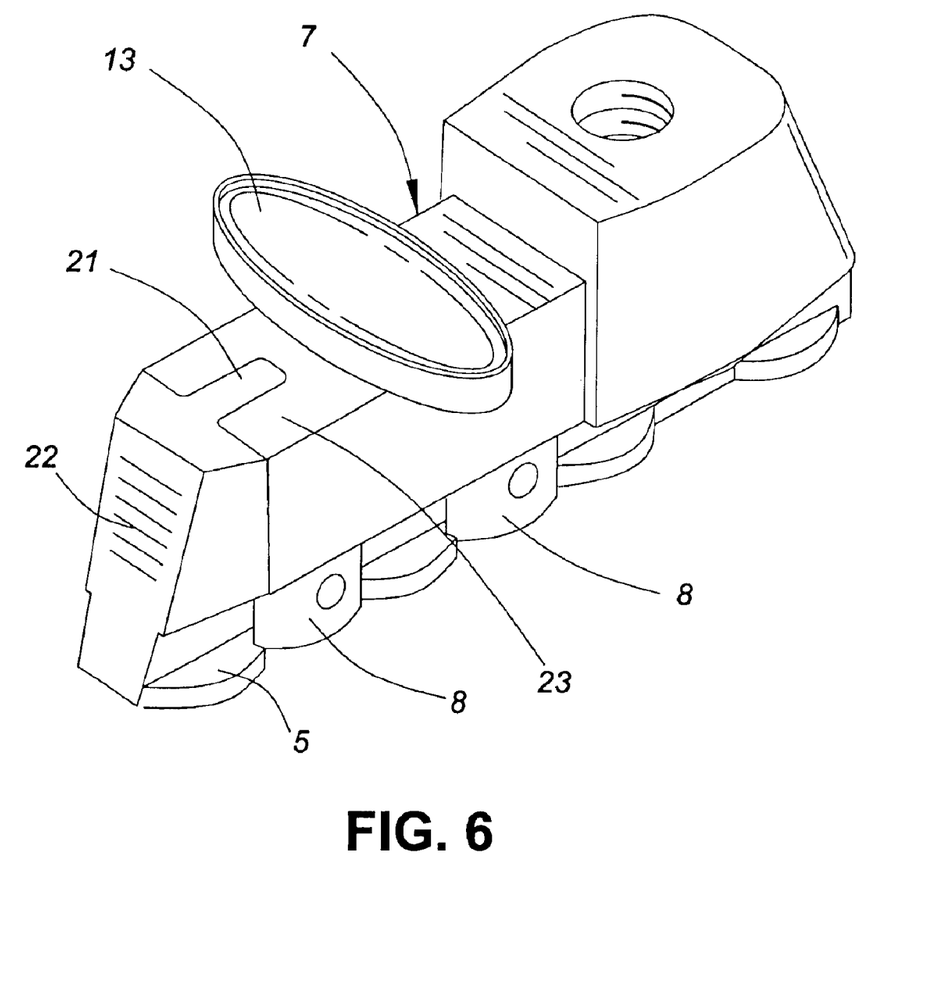
FIG. 6 is an isometric view, similar to FIG. 5, showing an alternative type of locking indicator.

In FIG. 6 there is shown an alternative embodiment of the visual indicator described with reference to FIG. 5. Track fitting 7 is provided with finger grips 13, 14, plungers 8 and lugs 5 as in other embodiments, and the rear of fitting 7 is provided with a finger 21, forming part of the housing 22 of fitting 7, and extending longitudinally into a cover 23 forming part of finger grips 13, 14, such that when the plungers 8 are in the fully depressed and locked position, the top surface of finger 21 is flush with the top surface of cover 23. It will be appreciated that if plungers 8 are not fully locked, then the surface of cover 23 will be above the surface of finger 21 and the difference therebetween will provide a clear visual indication that the fingers are not locked.

Figure 7:
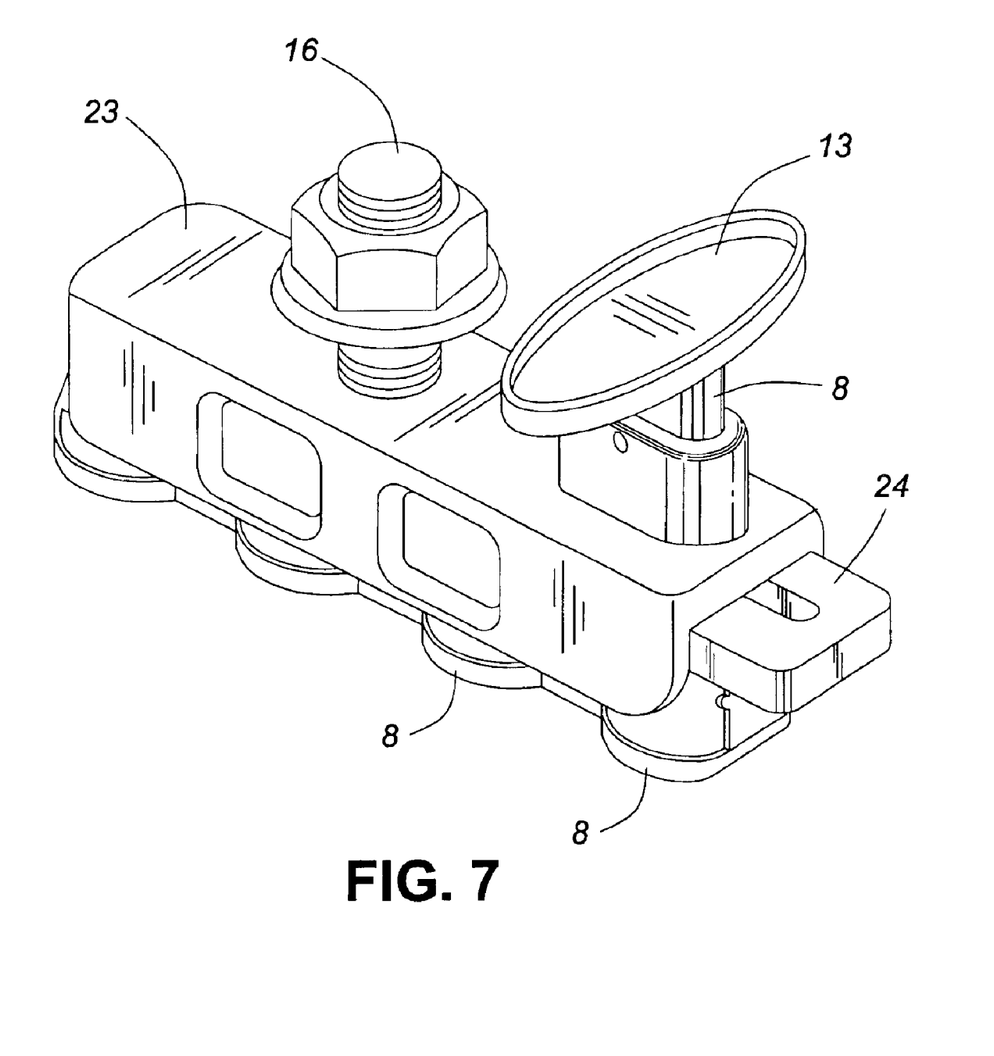
FIG. 7 is an isometric view of the embodiment of FIG. 2, in the unlocked position, incorporating a slide mechanism to lock said plungers into locked position.
Figure 8:
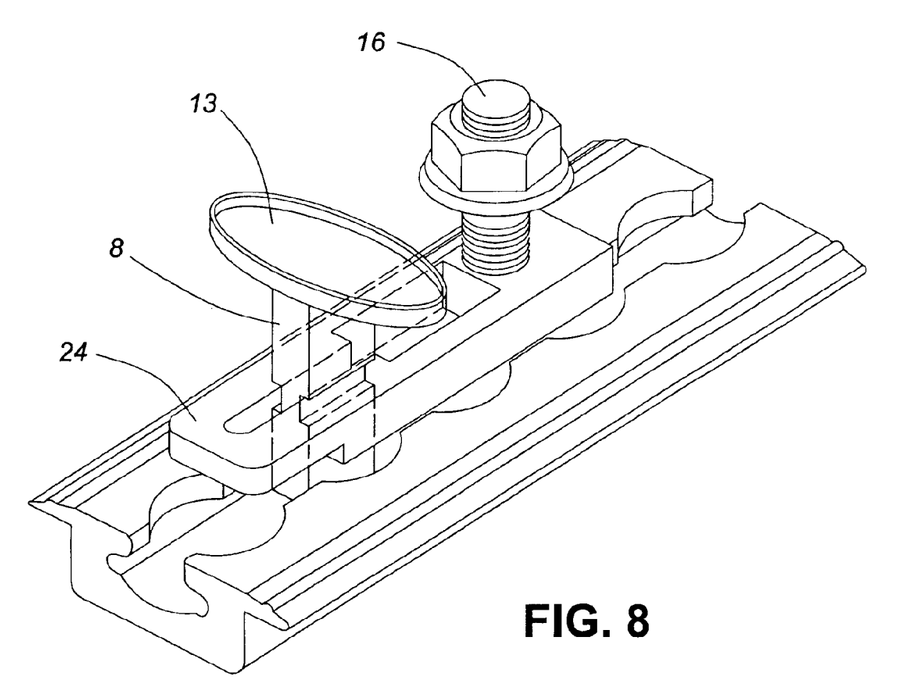
FIG. 8 is an internal view of FIG. 7 illustrating the slide mechanism.
Figure 9:
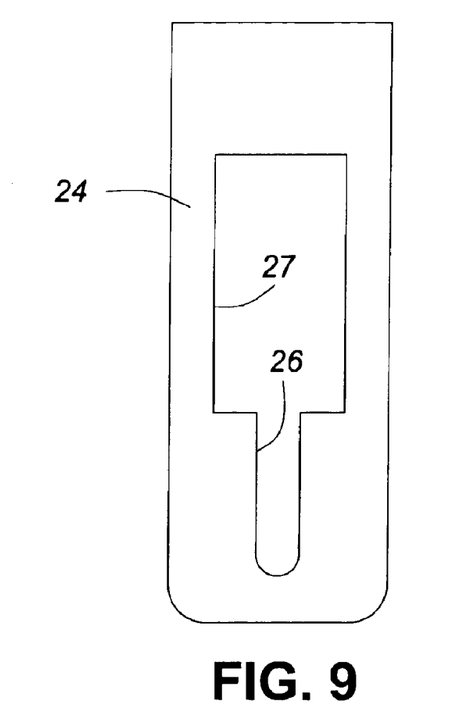
FIG. 9 is a plan view of the slide of FIG. 8.
Figure 10:
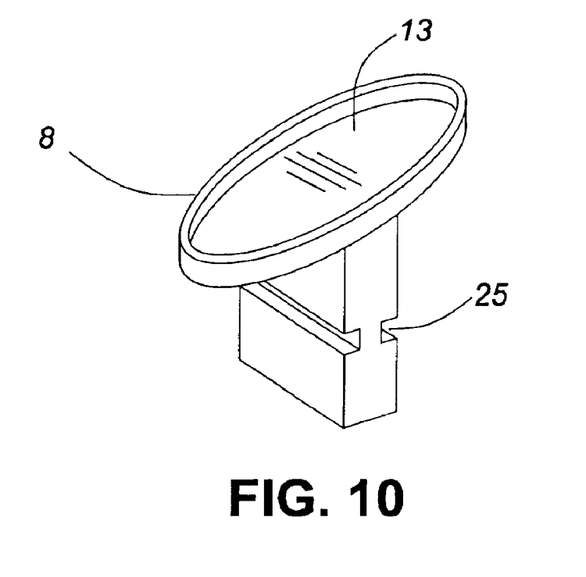
FIG. 10 is an enlarged view of the plunger of FIG. 8.

In some circumstances it may also be desirable to provide a visual indication of locking and to secure the plungers in the locked position by a positive locking mechanism. One such lock is illustrated in FIGS. 7 and 8, in which the pin 18 and finger 21 of FIGS. 5 and 6 are replaced by a slide 24, projecting rearwardly from the cover 23 and movable from an extended unlocked position, shown in FIG. 7, to a closed locked position (not shown) in which the slide engages plungers 8 so as to hold them in the locked position and prevent lifting of finger grips 13, 14 until the lock slide 24 is extended rearwardly. As seen more clearly in FIG. 9, slide 24 is provided with a narrow slot 26 which engages in slot 25 in the plungers 8 and a wider slot 27 which disengages from slot 25 when the slide 24 is pulled outwardly to the unlocked position.

I claim:

1. A double plunger track fitting comprising:
   a body member including means to secure a restraining strap thereto, and at least four track engaging lugs on each side of said body and extending laterally therefrom when in operative position;
   two separate spring loaded means on each side of said body member, each having a pair of plungers longitudinally from each other and adapted to slide, when in operative position, between two adjacent pairs of said track engaging lugs between a raised unlocked position and a lowered locked position; and
   finger grip means on each of said two separate spring loaded means arranged in overlying relationship to each other.

2. A double plunger track fitting as claimed in claim 1, wherein said body member is a die cast metal member.

3. A double plunger track fitting as claimed in claim 2 wherein said two separate spring loaded means comprise a pair of plungers each having a pair of longitudinally spaced track engaging members and a pair of finger grips in overlying relationship to each other.

4. A double plunger track fitting as claimed in claim 3 including strap engaging lug means mounted on said body member.

5. A double plunger track fitting as claimed in claim 1 and including visual means to indicate when said plungers are in said lowered locked position.

6. A double plunger track fitting as claimed in claim 5 wherein said visual means comprises multi-coloured pin means extending through said body member.

7. A double plunger track fitting as claimed in claim 5 wherein said visual means comprises finger means extending longitudinally into said body member and having an upper surface aligned with an upper surface of said body member when in a selected one of said locked and unlocked positions.

8. A double plunger track fitting as claimed in claim 5 including slide means to positively lock said plungers in said locked position.

* * * * *